(12) United States Patent
Tsuchiya (10) Patent No.: US 9,014,550 B2
(45) Date of Patent: Apr. 21, 2015

(54) TRANSMISSION DEVICE, TRANSMISSION METHOD, AND PROGRAM (75) Inventor: Masahiko Tsuchiya, Tokyo (JP)

(73) Assignee: NEC Corporation, Tokyo (JP)

( * ) Notice: Subject to any disclaimer, the term of this patent is extended or adjusted under 35 U.S.C. 154(b) by 107 days.

(21) Appl. No.: 13/823,567

(22) PCT Filed: Sep. 6, 2011

(86) PCT No.: PCT/JP2011/070269
§ 371 (c)(1),
(2), (4) Date: Mar. 14, 2013

(87) PCT Pub. No.: WO2012/036027
PCT Pub. Date: Mar. 22, 2012

(65) Prior Publication Data
US 2013/0170838 A1 Jul. 4, 2013

(30) Foreign Application Priority Data
Sep. 16, 2010 (JP) ................. 2010-207541

(51) Int. Cl.
H04B 10/00 (2013.01)
H04J 14/08 (2006.01)
H04J 3/16 (2006.01)

(52) U.S. Cl.
CPC ............ H04J 14/08 (2013.01); H04J 3/1652 (2013.01); H04J 2203/0005 (2013.01); H04J 2203/006 (2013.01)

(58) Field of Classification Search
None
See application file for complete search history.

(56) References Cited

U.S. PATENT DOCUMENTS

2011/0004700 A1* 1/2011 Sprague et al. ............... 709/236
2011/0292788 A1* 12/2011 Tsuchiya ...................... 370/218
2013/0039658 A1* 2/2013 Abbas et al. .................... 398/52

FOREIGN PATENT DOCUMENTS

| JP | 2003-143171 A | 5/2003 |
| JP | 2008-004993 A | 1/2008 |
| JP | 2008-113344 A | 5/2008 |
| JP | 2008-177773 A | 7/2008 |

OTHER PUBLICATIONS

International Search Report (ISR) for PCT/JP2011/070269 dated Dec. 6, 2011.

* cited by examiner

Primary Examiner — Li Liu
(74) Attorney, Agent, or Firm — Sughrue Mion, PLLC (57) ABSTRACT A cross connecting unit outputs an including frame whose type matches a type of an including frame stored in a storage unit in association with identification information of a multiplexing unit having a problem among including frames generated by an including unit to a backup multiplexing unit when any one of multiplexing units has a problem.

5 Claims, 7 Drawing Sheets

| CLIENT SIDE INTERFACE UNIT | | FORMAT OF INCLUDING FRAME | SYSTEM SIDE INTERFACE UNIT INFORMATION | |
|---|---|---|---|---|
| CLIENT SIDE INTERFACE ID | TIME SLOT | | SYSTEM SIDE INTERFACE ID | TIME SLOT |
| 1 | 1, 2 | ODU1 2.5G | 1 | 1, 2 |
| 1 | 3, 4 | ODU1 2.5G | 1 | 3, 4 |
| 1 | 5, 6 | ODU1 2.5G | 1 | 5, 6 |
| 1 | 7, 8 | ODU1 2.5G | 1 | 7, 8 |
| ...... | ...... | ...... | ...... | ...... |
| 2 | 1 | ODU0 1.25G | 2 | 1 |
| 2 | 2 | ODU0 1.25G | 2 | 2 |
| 2 | 3 | ODU0 1.25G | 2 | 3 |
| 2 | 4 | ODU0 1.25G | 2 | 4 |
| 2 | 5 | ODU0 1.25G | 2 | 5 |
| 2 | 6 | ODU0 1.25G | 2 | 6 |
| 2 | 7 | ODU0 1.25G | 2 | 7 |
| 2 | 8 | ODU0 1.25G | 2 | 8 |
| ...... | ...... | ...... | ...... | ...... |
| 3 | 1~8 | ODU2 10G | 3 | 1~8 |
| ...... | ...... | ...... | ...... | ...... |

//www.w3.org/1999/xhtml">

TRANSMISSION DEVICE, TRANSMISSION METHOD, AND PROGRAM

TECHNICAL FIELD

The present invention relates to a transmission device that transmits a plurality of client signals to another device, a transmission method, and a program.

BACKGROUND ART

In an optical transport network (OTN) hierarchy of an OTN transmission scheme, various multiplexing schemes are defined. It is desirable that a transmission device can support various multiplexing schemes. When each interface of a transmission device has a function of selecting a different multiplexing scheme, each interface needs to include a clock circuit for frequency-reproducing a communication rate of each different optical data unit (ODU) frame, a multiplexing/demultiplexing circuit of each multiplexing scheme, and a stuff circuit. Particularly, in an OTN communication scheme, since a communication frequency slightly differs according to an ODU frame (asynchronous communication), an oscillator phase locked loop (PLL) circuit needs to be separately provided. For this reason, a transmission device with a function of selecting different multiplexing schemes has a problem in that a circuit is complicated, and the cost and the power consumption of the transmission device increase.

For this reason, in a general transmission device, the circuit size is reduced such that only a circuit for a predetermined multiplexing scheme is installed in each interface.

Further, a transmission device includes a backup interface in order to cope with a problem of an active interface, and preferably performs communication path switching control of switching to the backup interface when the active interface has a problem.

A general transmission device executes communication path switching control by performing the following process.

A transmission device includes a backup interface corresponding to each active interface, and performs control such that a transmission device of a switching source matches a transmission device of a switching destination in a communication control state. Further, the transmission device of the switching source duplicates one client signal to a plurality of same signals, outputs the plurality of same signals to the active interface and the backup interface, and the transmission device of the switching destination selects any interface of the current system and the backup system which is to use a received signal.

Patent Document 1 discloses a technique of performing path switching by mapping two or more types of client signals to a frame of a format and performing time division multiplexing (TDM) on the corresponding signal.

Further, Patent Document 2 discloses a technique of adjusting a bit rate of two or more types of client signals to a rate range that can be included in a digital frame.

PRIOR ART DOCUMENTS

Patent Documents

Patent Document 1: Japanese Unexamined Patent Application Publication, No. 2008-113344 A
Patent Document 2: Japanese Unexamined Patent Application Publication, No. 2008-177773 A

DISCLOSURE OF THE INVENTION

Problems to be Solved by the Invention

However, when the above-mentioned communication path switching control technique is applied, at least one backup interface needs to be provided on one active interface. For this reason, there is a problem in that the number of backup interfaces provided in the transmission device increases, and the cost and the power consumption of the transmission device increase.

Means for Solving the Problems

The present invention is made to resolve the above problems, and provides a transmission device that multiplexes a plurality of client signals into an ODU frame, and transmits the ODU frame to another device, and includes an including unit that includes an input client signal in a payload portion, and generates an including frame which is an ODU frame of a predetermined format by time division multiplexing, a storage unit that stores identification information of a multiplexing unit that performs time division multiplexing on the client signal in association with a type of a client signal received by the including unit, a cross connecting unit that outputs the including frame generated by the including unit to the multiplexing unit represented by the identification information stored in the storage unit in association with the format of the including frame, a plurality of multiplexing units, each of which multiplexes the including frame input from the cross connecting unit into a transmission frame which is an ODU frame of a predetermined format, a transmission frame transmitting unit that transmits the transmission frame multiplexed by the multiplexing unit to another device, a backup multiplexing unit that multiplexes the including frame input from the cross connecting unit into a transmission frame of a predetermined format by time division multiplexing when one of the multiplexing units has a problem, and a backup transmission frame transmitting unit that transmits the transmission frame multiplexed by the backup multiplexing unit to another device, wherein the cross connecting unit outputs an including frame whose format matches a format of an including frame stored in the storage unit in association with identification information of the multiplexing unit having the problem among including frames generated by the including unit to the backup multiplexing unit when the multiplexing unit has the problem.

Further, the present invention provides a transmission method which uses a transmission device that includes a storage unit storing identification information of a multiplexing unit performing time division multiplexing on an including frame which is an ODU frame including a client signal for each type of the client signal, multiplexes the client signal, and transmits the multiplexed client signal to another device, and includes generating an including unit, an including frame of a predetermined format in which an input client signal is included in a payload portion, outputting, by a cross connecting unit, the including frame generated by the including unit to the multiplexing unit represented by identification information stored in the storage unit in association with the format of the including frame, multiplexing, by each of a plurality of multiplexing units, the including frame input from the cross connecting unit into a transmission frame which is a predetermined ODU frame by time division multiplexing, transmitting, by a transmission frame transmitting unit, the transmission frame multiplexed by the multiplexing unit to another device, when one of the multiplexing units has a problem, outputting, by the cross connecting unit, an including frame whose format matches a format of an including frame stored in the storage unit in association with identification information of the multiplexing unit having the problem among including frames generated by the including unit to a backup multiplexing unit, multiplexing, by the backup multiplexing unit, the including frame input from the cross connecting unit into a payload portion of a predetermined transmission frame by time division multiplexing, and transmitting, by a backup transmission frame transmitting unit, the transmission frame multiplexed by the backup multiplexing unit to another device.

Further, the present invention provides a program causing a transmission device that multiplexes a plurality of client signals, and transmits the multiplexed frame to another device to execute an including unit that includes an input client signal in a payload portion, and generates an including frame which is an ODU frame of a predetermined format, a plurality of multiplexing units, each of which multiplexes an including frame generated by the including unit into a transmission frame of a predetermined format by time division multiplexing, a transmission frame transmitting unit that transmits the transmission frame multiplexed by the multiplexing unit to another device, a cross connecting unit that outputs the including frame generated by the including unit to the multiplexing unit represented by the identification information stored in a storage unit in association with the format of the including frame, a backup multiplexing unit that multiplexes the including frame in which the client signal is included by the including unit into a payload portion of a transmission frame of a predetermined format which is an ODU frame by time division multiplexing when one of the multiplexing units has a problem, and a transmission frame transmitting unit that transmits the transmission frame multiplexed by the backup multiplexing unit to another device, wherein the cross connecting unit outputs an including frame whose format matches a format of an including frame stored in the storage unit in association with identification information of the multiplexing unit having the problem among including frames generated by the including unit to the backup multiplexing unit when the multiplexing unit has the problem.

Effects of the Invention

As described above, according to the present invention, each of a plurality of data to be output is stored corresponding to a value association with each of the plurality of data, a slider bar used to receive selection of a specific value from a range of values associated with a plurality of data is displayed on a display unit, an input of a value selected by the slider bar displayed on the display unit is received, and data corresponding to a value input by an input unit is read and output to an output unit. Consequently, a data output control device and a data output control method which are capable of simply selecting specific data from a plurality of data can be provided.

EMBODIMENTS FOR CARRYING OUT THE INVENTION

Hereinafter, embodiments of the present invention will be described in detail with reference to the accompanying drawings.

Figure 1:
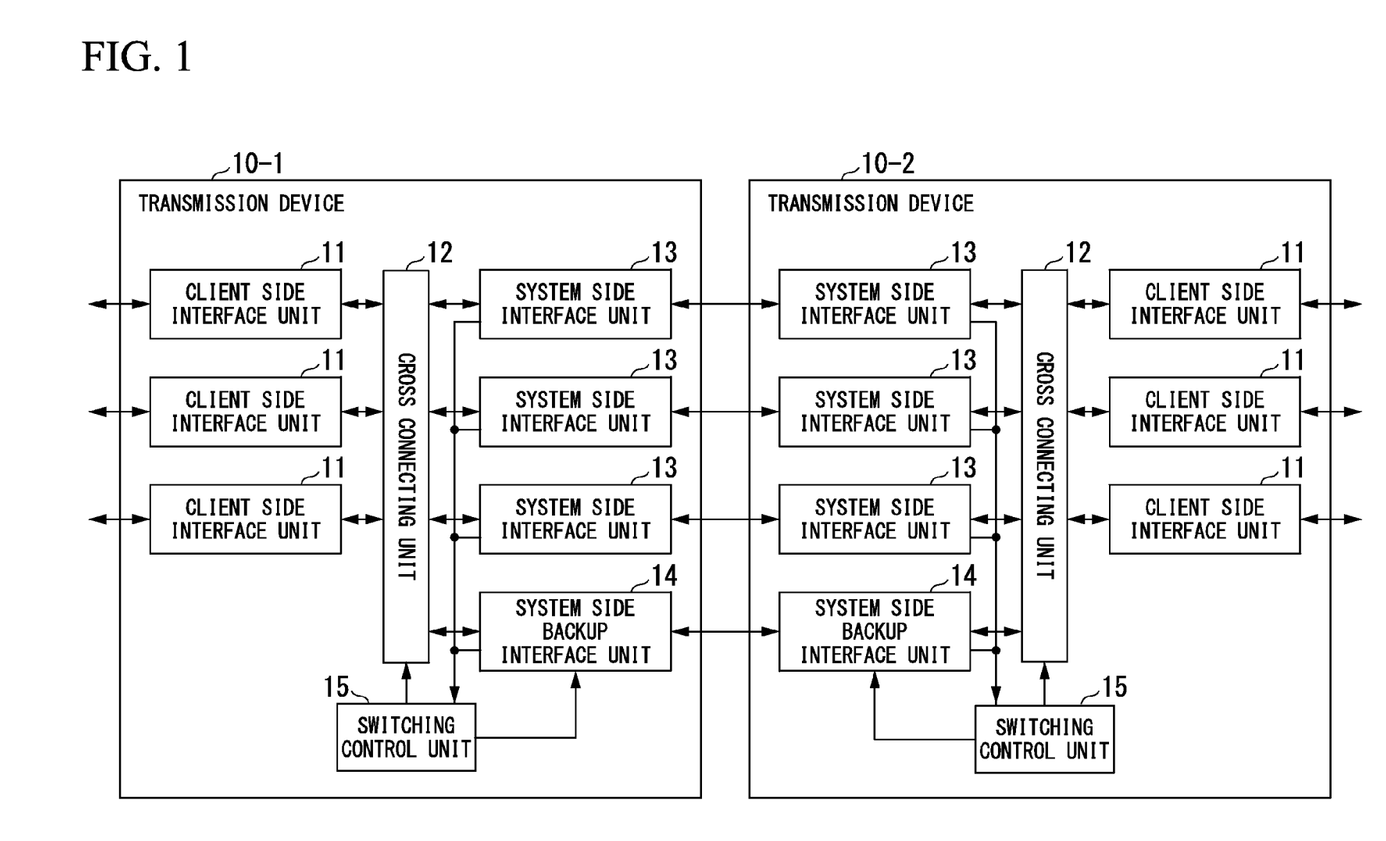
FIG. 1 is a schematic block diagram illustrating a configuration of a transmission system including a transmission device according to an embodiment of the present invention.

FIG. 1 is a schematic block diagram illustrating a configuration of a transmission system including a transmission device according to an embodiment of the present invention.

The transmission system is a system that transmits client signals received from one client device group to the other client device group. The transmission system includes a pair of transmission devices 10-1 and 10-2 (hereinafter, the transmission devices 10-1 and 10-2 may be collectively referred to as a "transmission device 10") which are connected by an optical communication path, the transmission device 10-1 is connected to one client device group, and the transmission device 10-2 is connected to the other client device group.

The transmission device 10 includes a plurality of client side interface units 11, a cross connecting unit 12, a plurality of system side interface units 13, a system side backup interface unit 14, and a switching control unit 15.

The client side interface unit 11 receives a client signal (for example, an Ethernet (a registered trademark) signal or an STM signal) from one client device. The client side interface unit 11 includes the received signal in a corresponding ODU frame (hereinafter referred to as an "including frame"), and outputs the including frame including the signal to the cross connecting unit 12. The client side interface unit 11 reproduces a client signal from an including frame input from the cross connecting unit 12, and transmits the reproduced client signal to the client device.

The cross connecting unit 12 performs an including frame transfer process between the client side interface unit 11 and the system side interface unit 13 based on information stored in the switching control unit 15.

The system side interface unit 13 multiplexes a plurality of including frames input from the cross connecting unit 12 into a high-speed ODU frame (hereinafter referred to as a "transmission frame"), and transmits the transmission frame to another opposite transmission device 10. The system side interface unit 13 of the other transmission device 10 reads a plurality of including frames from a payload portion of the transmission frame transmitted from the opposite transmission device 10, and outputs the plurality of including frames to the cross connecting unit 12. In the present embodiment, an ODU3 frame is used as the transmission frame. The system side interface unit 13 detects communication failure, and notifies the switching control unit 15 of the communication failure.

The system side backup interface unit 14 multiplexes a plurality of including frames input from the cross connecting unit 12 into a transmission frame, and transmits the transmission frame to another opposite transmission device 10, similarly to the system side interface unit 13. The system side interface unit 13 reads a plurality of including frames from a payload portion of the transmission frame transmitted from the opposite transmission device 10, and outputs the plurality of including frames to the cross connecting unit 12.

The switching control unit 15 switches a transfer destination of the including frame by the cross connecting unit 12 and a multiplexing/demultiplexing function of the system side backup interface unit 14.

Figure 2:
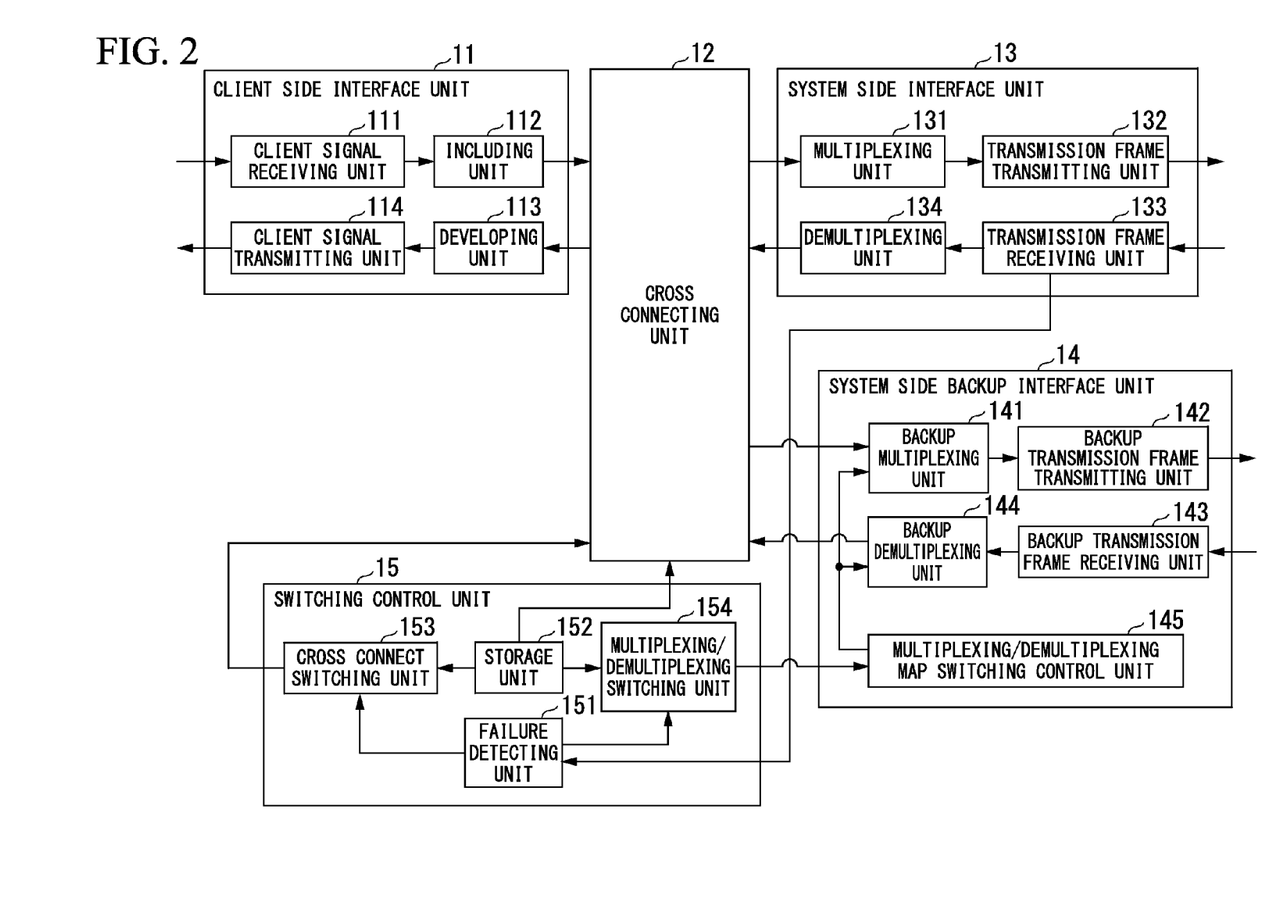
FIG. 2 is a schematic block diagram illustrating a configuration of a transmission device according to an embodiment of the present invention.

FIG. 2 is a schematic block diagram illustrating a configuration of the transmission device 10 according to an embodiment of the present invention.

The client side interface unit 11 includes a client signal receiving unit 111, an including unit 112, a developing unit 113, and a client signal transmitting unit 114.

The client signal receiving unit 111 receives the client signal from the client device.

The including unit 112 includes the client signal received by the client signal receiving unit 111 in the payload portion of the including frame corresponding to the transmission rate of the client signal, and outputs the resultant including frame to the cross connecting unit 12.

Here, the including frame corresponding to the transmission rate of the client signal refers to an including frame of a format which is closest to the transmission rate of the client signal and has payload capacity being equal to or more than the transmission rate. For example, an Ethernet (a registered trademark) signal of 1 Gbps is included in an ODU0 frame having a band of about 1.25 Gbps. An STM-16 signal is included in an ODU1 frame having a band of 2.5 Gbps. Further, an STM-64 signal or an Ethernet (a registered trademark) signal of 10 Gbps is included in an ODU2 frame having a band of 10 Gbps.

As described above, the client signal is included in the including frame corresponding to the transmission rate, and the client signal received from the client device can be output to the cross connecting unit 12 at an equivalent speed.

The transmission rate of the client signal received from the client device by the client side interface unit 11 and the format of the including frame differ according to each client side interface unit 11. For example, a client side interface unit 11 receives a signal having a band of 1.25 Gbps or less such as the Ethernet (a registered trademark) signal of the 1 Gbps from the client device, and the input signal is included in the ODU0 frame.

Further, a client side interface unit 11 receives a signal having a band of 1.25 to 2.5 Gbps such as the STM-16 signal from the client device, and the input signal is included in the ODU1 frame.

Further, a client side interface unit 11 receives a signal having a band of 2.5 to 5 Gbps such as the STM-64 signal from the client device, and the input signal is included in the ODU2 frame.

As described above, the type of the signal input to the client side interface unit 11 and the format of the including frame are limited, and thus a configuration of the client side interface unit 11 can be simplified, and the manufacturing cost can be reduced.

The system side interface unit 13 includes a multiplexing unit 131, a transmission frame transmitting unit 132, a transmission frame receiving unit 133, and a demultiplexing unit 134.

The multiplexing unit 131 multiplexes the including frame input from the cross connecting unit 12 into the transmission frame by time division multiplexing. A predetermined format is decided as the format of the including frame multiplexed by the system side interface unit 13 in advance. The multiplexing unit 131 has only a function of multiplexing the including frame of the predetermined format into the transmission frame. Specifically, when the including frame input to a system side interface unit 13 is the ODU1 frame, the multiplexing unit 131 includes an overhead adding unit that adds an overhead necessary for multiplexing the ODU1 frame into the ODU3 frame serving as the transmission frame and a multiplexing processing unit that multiplexes the ODU1 frame including the overhead into the ODU1 frame. However, the multiplexing unit 131 has neither a function of adding an overhead to the ODU0 frame nor a function of multiplexing the ODU0 frame into the ODU3 frame. As described above, the function of the multiplexing unit 131 is limited to correspond to the format of the transmission frame input to the system side interface unit 13, and thus the configuration of the system side interface unit 13 can be simplified, and the manufacturing cost can be reduced.

The transmission frame transmitting unit 132 transmits the transmission frame generated by the multiplexing unit 131 to the corresponding system side interface unit 13 of the opposite transmission device 10.

The transmission frame receiving unit 133 receives the transmission frame from the corresponding system side interface unit 13 of the opposite transmission device 10. The transmission frame receiving unit 133 detects communication failure, and notifies the switching control unit 15 of the communication failure.

The demultiplexing unit 134 demultiplexes the transmission frame received by the transmission frame receiving unit 133 into the including frame. Similarly to the multiplexing unit 131, a predetermined format is decided as the format of the including frame included in the transmission frame received by the system side interface unit 13, and the demultiplexing unit 134 has only a function of demultiplexing the transmission frame into the including frame of the predetermined format.

The system side backup interface unit 14 includes a backup multiplexing unit 141, a backup transmission frame transmitting unit 142, a backup transmission frame receiving unit 143, a backup demultiplexing unit 144, and a multiplexing/demultiplexing map switching control unit 145.

The backup multiplexing unit 141 multiplexes the including frame input from the cross connecting unit 12 into the transmission frame by time division multiplexing. The backup multiplexing unit 141 has a function of multiplexing an including frame of a format supported by the system side interface unit 13 into a transmission frame. Specifically, when the including frame input to a system side interface unit 13 is the ODU1 frame, and the including frame input to another system side interface unit 13 is the ODU0 frame, the multiplexing unit 141 has a function of multiplexing the ODU1 frame into the ODU3 frame serving as the transmission frame and a function of multiplexing the ODU0 frame into the ODU3 frame serving as the transmission frame.

The backup transmission frame transmitting unit 142 transmits the transmission frame generated by the backup multiplexing unit 141 to the system side backup interface unit 14 of the opposite transmission device 10.

The backup transmission frame receiving unit 143 receives the transmission frame from the system side backup interface unit 14 of the opposite transmission device 10.

The backup demultiplexing unit 144 demultiplexes the transmission frame received by the backup transmission frame receiving unit 143 into the including frame. The backup demultiplexing unit 144 has a function of demultiplexing a transmission frame of a format supported by the system side interface into the including frame, similarly to the backup multiplexing unit 141.

The multiplexing/demultiplexing map switching control unit 145 receives a transmission frame of a format serving as a target of a multiplexing process and demultiplexing process (the ODU0 frame, the ODU1 frame, or the ODU2 frame) from the switching control unit 15, and instructs the backup multiplexing unit 141 and the backup demultiplexing unit 144 to perform the multiplexing process and the demultiplexing process on the transmission frame of the corresponding format.

The switching control unit 15 includes a failure detecting unit 151, a storage unit 152, a cross connect switching unit 153, and a multiplexing/demultiplexing switching unit 154.

The failure detecting unit 151 receives a communication failure notice from the system side interface unit 13 and detects the failure, and outputs a system side interface ID specifying the system side interface unit 13 in which the failure has occurred to the cross connect switching unit 153 and the multiplexing/demultiplexing switching unit 154.

Figure 3:
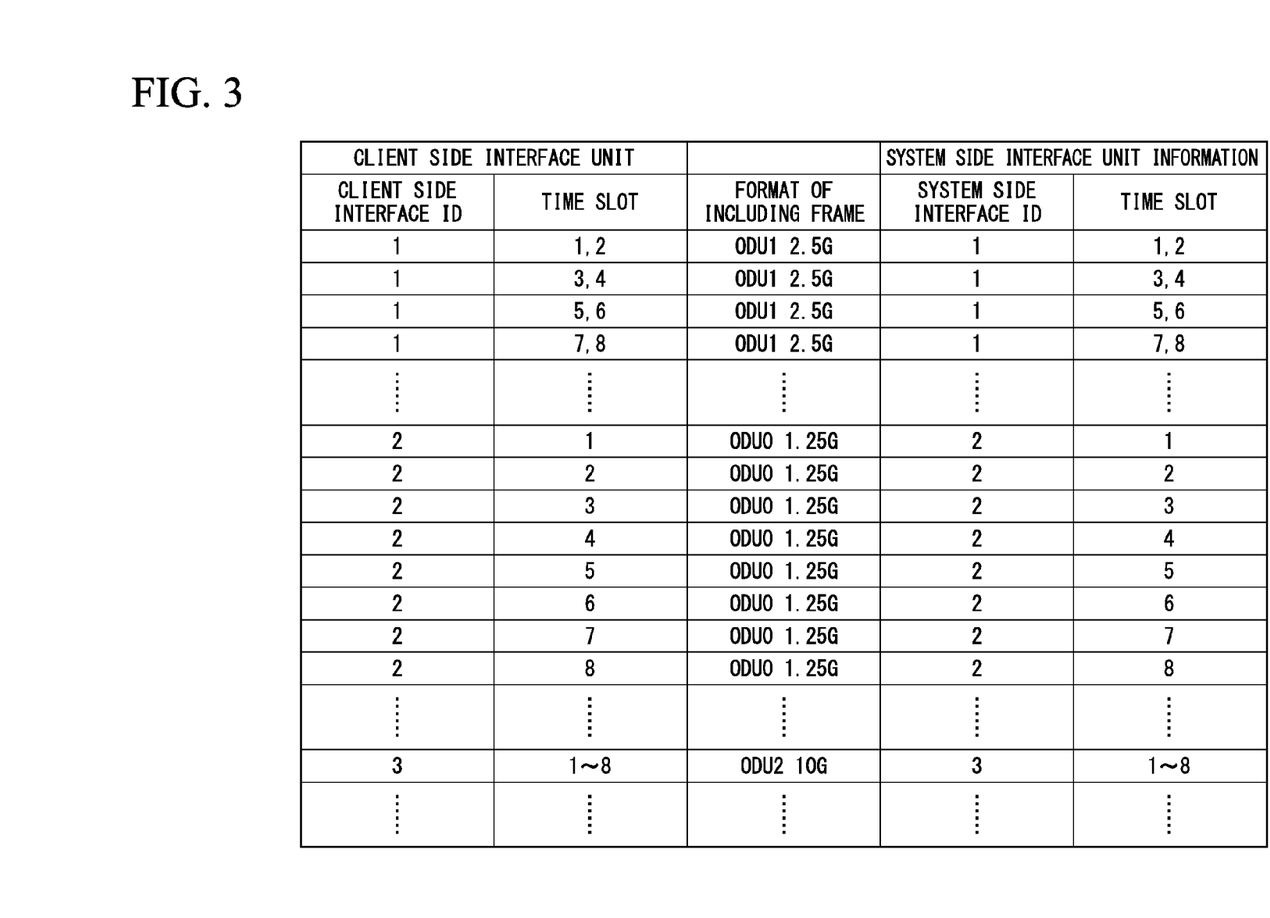
FIG. 3 is a diagram illustrating an example of a table stored in a storage unit.

FIG. 3 is a diagram illustrating an example of a table stored in the storage unit 152.

The storage unit 152 stores payload capacity of an including frame, a system side interface ID of the system side interface unit 13 that performs time division multiplexing on the including frame, and a time slot in which the including frame is output to the system side interface unit 13 in association with a set of a client side interface ID specifying the client side interface unit 11 and a time slot of an including frame output by the client side interface unit 11.

The cross connect switching unit 153 outputs a cross connect switching command for performing switching such that an including frame represented by a set of the client side interface ID and the time slot associated with the system side interface ID input from the failure detecting unit 151 is transmitted to the system side backup interface unit 14 to the cross connecting unit 12.

The multiplexing/demultiplexing switching unit 154 outputs a multiplexing/demultiplexing switching command for performing time division multiplexing/demultiplexing on an including frame of a format associated with the system side interface ID input from the failure detecting unit 151 to the system side backup interface unit 14.

As the transmission device 10 has the above-described configuration, the including unit 112 generates an including frame (the ODU1 frame, the ODU2 frame, or the ODU3 frame) of a predetermined format in which the input client signal is included in the payload portion, and the cross connecting unit 12 outputs the including frame generated by the including unit 112 to the multiplexing unit 131 represented by the identification information stored in the storage unit 152 in association with the format of the including frame. Further, each of a plurality of multiplexing units 131 performs time division multiplexing on the including frame input from the cross connecting unit 12, and the transmission frame transmitting unit 132 transmits the transmission frame multiplexed by the multiplexing unit 131 to another device.

Further, when any one of the multiplexing units 131 has a problem, the cross connecting unit 12 outputs the including frame whose format matches the format of the including frame stored in the storage unit 152 in association with the identification information of the multiplexing unit 131 having the problem among the including frames generated by the including unit 112 to the backup multiplexing unit 141. Further, the backup multiplexing unit 141 multiplexes the including frame input from the cross connecting unit 12 to a payload portion of a predetermined transmission frame by time division multiplexing, and the backup transmission frame transmitting unit 142 transmits the transmission frame multiplexed by the backup multiplexing unit 141 to another device.

As a result, the transmission device 10 need not include the multiplexing unit 131 and the backup multiplexing unit 141 in a one-to-one manner, and thus the number of backup communication paths provided in the transmission device 10 can be reduced.

Figure 4:
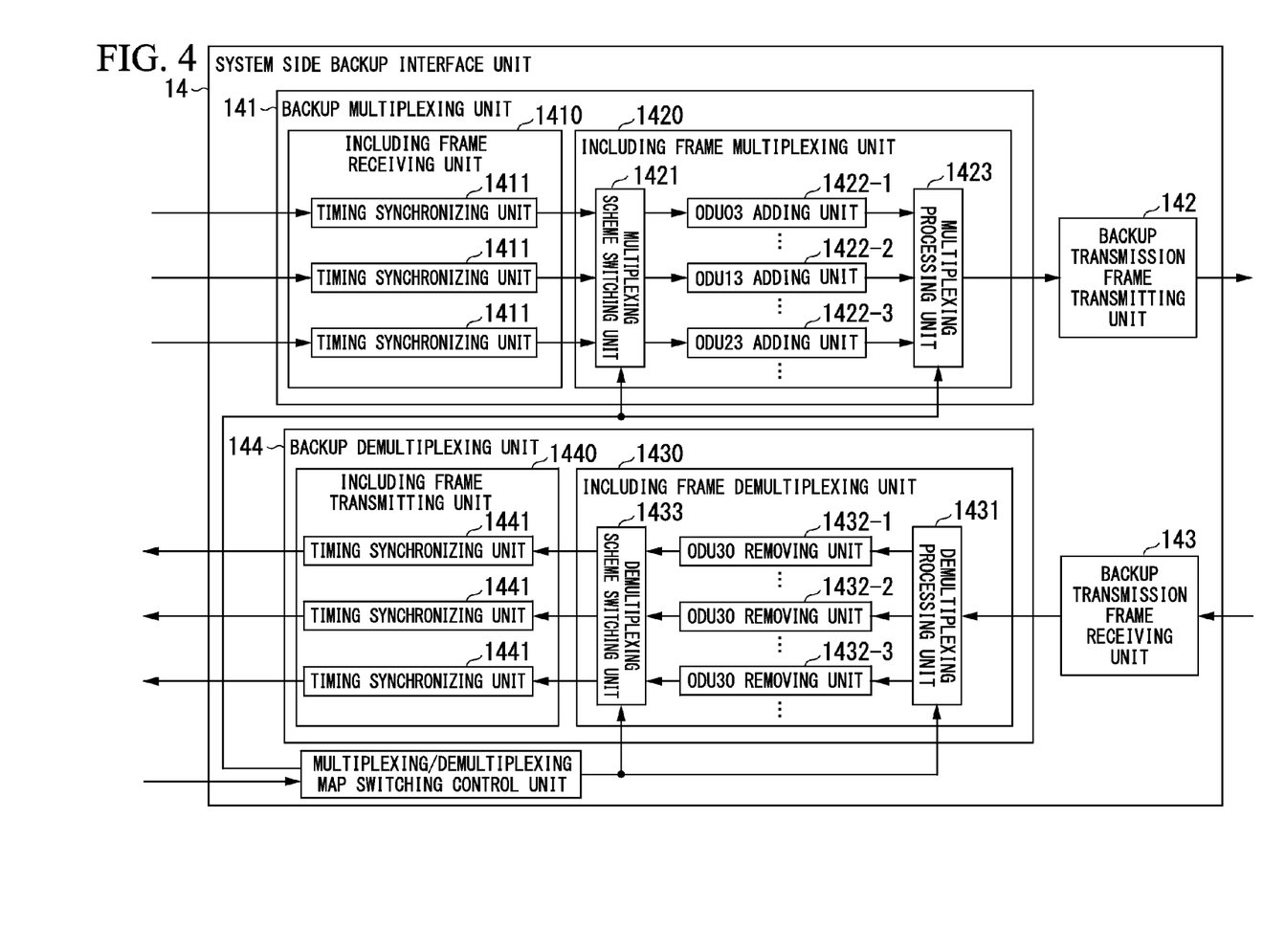
FIG. 4 is a schematic block diagram illustrating a configuration of a system side backup interface unit.

FIG. 4 is a schematic block diagram illustrating a configuration of the system side backup interface unit 14.

The backup multiplexing unit 141 of the system side backup interface unit 14 includes an including frame receiving unit 1410 and an including frame multiplexing unit 1420.

The including frame receiving unit 1410 receives the including frame from the client side interface unit 11 through the cross connecting unit 12.

The including frame multiplexing unit 1420 multiplexes the including frame received by the including frame receiving unit 1410 into the transmission frame, and outputs the transmission frame to the backup transmission frame transmitting unit 142.

The including frame receiving unit 1410 includes a plurality of timing synchronizing units 1411.

The timing synchronizing unit 1411 is provided to correspond to each client side interface unit 11, and receives the including frame in synchronization with the signal transmitted from each client side interface unit 11.

The including frame multiplexing unit 1420 includes a multiplexing scheme switching unit 1421, a plurality of overhead adding units 1422 (an ODU03 adding unit 1422-1, an ODU13 adding unit 1422-2, and an ODU23 adding unit 1422-3), and a multiplexing processing unit 1423.

The multiplexing scheme switching unit 1421 receives a multiplexing command representing a format of a transmission frame serving as a target of the multiplexing process from the multiplexing/demultiplexing map switching control unit 145, and outputs the transmission frame input from the including frame receiving unit 1410 to the overhead adding unit 1422 corresponding to the transmission frame represented by the multiplexing command.

The ODU03 adding unit 1422-1 adds an overhead necessary for multiplexing the ODU0 frame into the ODU3 frame. The including frame multiplexing unit 1420 includes at least the ODU03 adding units 1422-1 which are as many as the largest number of ODU0 frames among the numbers of ODU0 frames input to the respective system side interface units 13.

The ODU13 adding unit 1422-2 adds an overhead necessary for multiplexing the ODU1 frame into the ODU3 frame. The including frame multiplexing unit 1420 includes at least the ODU13 adding units 1422-2 which are as many as the largest number of ODU1 frames among the numbers of ODU1 frames input to the respective system side interface units 13.

The ODU23 adding unit 1422-3 adds an overhead necessary for multiplexing the ODU2 frame into the ODU3 frame. The including frame multiplexing unit 1420 includes at least the ODU23 adding units 1422-3 which are as many as the largest number of ODU2 frames among the numbers of ODU2 frames input to the respective system side interface units 13.

The multiplexing processing unit 1423 performs time division multiplexing on the transmission frame output from the overhead adding unit 1422 according to the multiplexing command input from the multiplexing/demultiplexing map switching control unit 145, and outputs the multiplexing result to the backup transmission frame transmitting unit 142.

The backup demultiplexing unit 144 of the system side backup interface unit 14 includes an including frame demultiplexing unit 1430 and an including frame transmitting unit 1440.

The including frame demultiplexing unit 1430 demultiplexes the transmission frame received by the backup transmission frame receiving unit 143 into a plurality of including frames, and outputs the including frames to the including frame transmitting unit 1440.

The including frame transmitting unit 1440 transmits the including frame to the client side interface unit 11 through the cross connecting unit 12.

The including frame demultiplexing unit 1430 includes a demultiplexing processing unit 1431, a plurality of overhead removing units 1432 (an ODU30 removing unit 1432-1, an ODU31 removing unit 1432-2, and an ODU32 removing unit 1432-3), and a demultiplexing scheme switching unit 1433.

The demultiplexing processing unit 1431 demultiplexes the transmission frame input from the backup transmission frame receiving unit 143 into a plurality of ODU frames. The demultiplexing processing unit 1431 receives a demultiplexing command representing a format of an including frame serving as a target of the demultiplexing process from the multiplexing/demultiplexing map switching control unit 145, and outputs a corresponding transmission frame to the overhead removing unit 1432 corresponding to the including frame represented by the demultiplexing command.

The ODU30 removing unit 1432-1 removes an overhead necessary for multiplexing the transmission frame from the ODU0 frame input from the demultiplexing processing unit 1431. The including frame demultiplexing unit 1430 includes at least the ODU30 removing units 1432-1 which are as many as the largest number of ODU0 frames among the numbers of ODU0 frames output from the respective system side interface units 13.

The ODU31 removing unit 1432-2 removes an overhead necessary for multiplexing the transmission frame from the ODU1 frame input from the demultiplexing processing unit 1431. The including frame demultiplexing unit 1430 includes at least the ODU31 removing units 1432-2 which are as many as the largest number of ODU1 frames among the numbers of ODU1 frames output from the system side interface units 13.

The ODU32 removing unit 1432-3 removes an overhead necessary for multiplexing the transmission frame from the ODU2 frame input from the demultiplexing processing unit 1431. The including frame demultiplexing unit 1430 includes at least the ODU32 removing unit 1432-3 which are as many as the largest number of ODU2 frames among the numbers of ODU2 frames output from the respective system side interface units 13.

The demultiplexing scheme switching unit 1433 receives the demultiplexing command from the multiplexing/demultiplexing map switching control unit 145, receives the including frame from the overhead removing unit 1432 corresponding to the including frame represented by the demultiplexing command, and outputs the corresponding including frame to the including frame transmitting unit 1440.

The including frame transmitting unit 1440 includes a plurality of timing synchronizing units 1441.

The timing synchronizing units 1441 are provided to correspond to each client side interface unit 11, and reproduces a carrier wave of a frequency corresponding to the including frame to be transmitted to each client side interface unit 11 and transmits the including frame through the carrier wave.

As illustrated in FIG. 4, the including frame multiplexing unit 1420 of the system side backup interface unit 14 includes the overhead adding unit 1422 and the overhead removing unit 1432 corresponding to a multiplexing scheme used by the transmission device 10 in order to support all multiplexing schemes. The system side interface unit 13 includes only the overhead adding unit and overhead removing unit corresponding to its own multiplexing scheme in order to prevent the circuit of the transmission device 10 from being complicated.

Next, an operation of the transmission system having the above configuration will be described. Here, the description will proceed in connection with an example in which the client device connected to the transmission device 10-1 transmits data to the client device connected to the transmission device 10-2.

Figure 5:
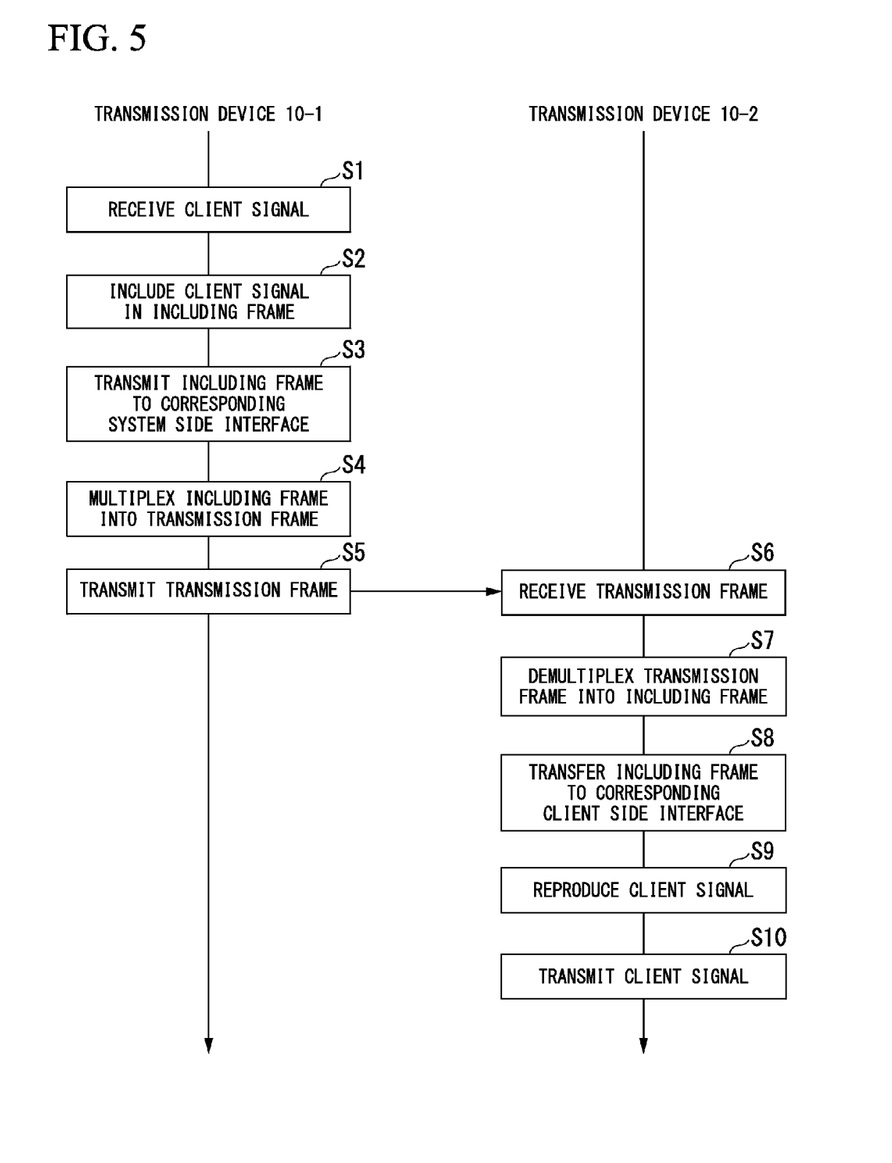
FIG. 5 is a sequence diagram illustrating an operation of a transmission system when there is no failure in a transmission path.

FIG. 5 is a sequence diagram illustrating an operation of the transmission system when there is no failure in a transmission path.

First, when the client device transmits the client signal to the transmission device 10-1, the client signal receiving unit 111 of the client side interface unit 11 of the transmission device 10-1 receives the client signal from the connected client device (step S1), and outputs the client signal to the including unit 112. Next, the including unit 112 includes the client signal input from the client signal receiving unit 111 in the payload portion of the including frame (step S2) and outputs the resultant including frame to the cross connecting unit 12.

Next, the cross connecting unit 12 outputs the including frame input from each client side interface unit 11 to the system side interface unit 13 represented by the system side interface ID associated with the client side interface ID of the client side interface unit 11 with reference to the table stored in the storage unit 152 of the switching control unit 15 (step S3).

Next, the multiplexing unit 131 of the system side interface unit 13 multiplexes a plurality of the including frames input from the cross connecting unit 12 into the payload portion of the transmission frame by time division multiplexing (step S4) and outputs the transmission frame to the transmission frame transmitting unit 132. Next, the transmission frame transmitting unit 132 transmits the transmission frame input from the multiplexing unit 131 to the transmission device 10-2 (step S5).

When the transmission device 10-1 transmits the transmission frame, the transmission frame receiving unit 133 of the system side interface unit 13 of the transmission device 10-2 receives the transmission frame from the transmission device 10-1 (step S6) and outputs the transmission frame to the demultiplexing unit 134. Next, the demultiplexing unit 134 demultiplexes the transmission frame input from the transmission frame receiving unit 133 into the including frame (step S7), and outputs the including frame to the cross connecting unit 12.

Next, the cross connecting unit 12 outputs the including frame input from each system side interface unit 13 to the client side interface unit 11 represented by the client side interface ID associated with the system side interface ID of the system side interface unit 13 with reference to the table stored in the storage unit 152 of the switching control unit 15 (step S8).

Next, the developing unit 113 of the client side interface unit 11 develops the including frame input from the cross connecting unit 12, and reproduces the client signal (step S9). Next, the client signal transmitting unit 114 transmits the client signal reproduced by the developing unit 113 to the client device (step S10).

Through the above-described process, the transmission system transmits the client signal between the client devices.

Figure 6:
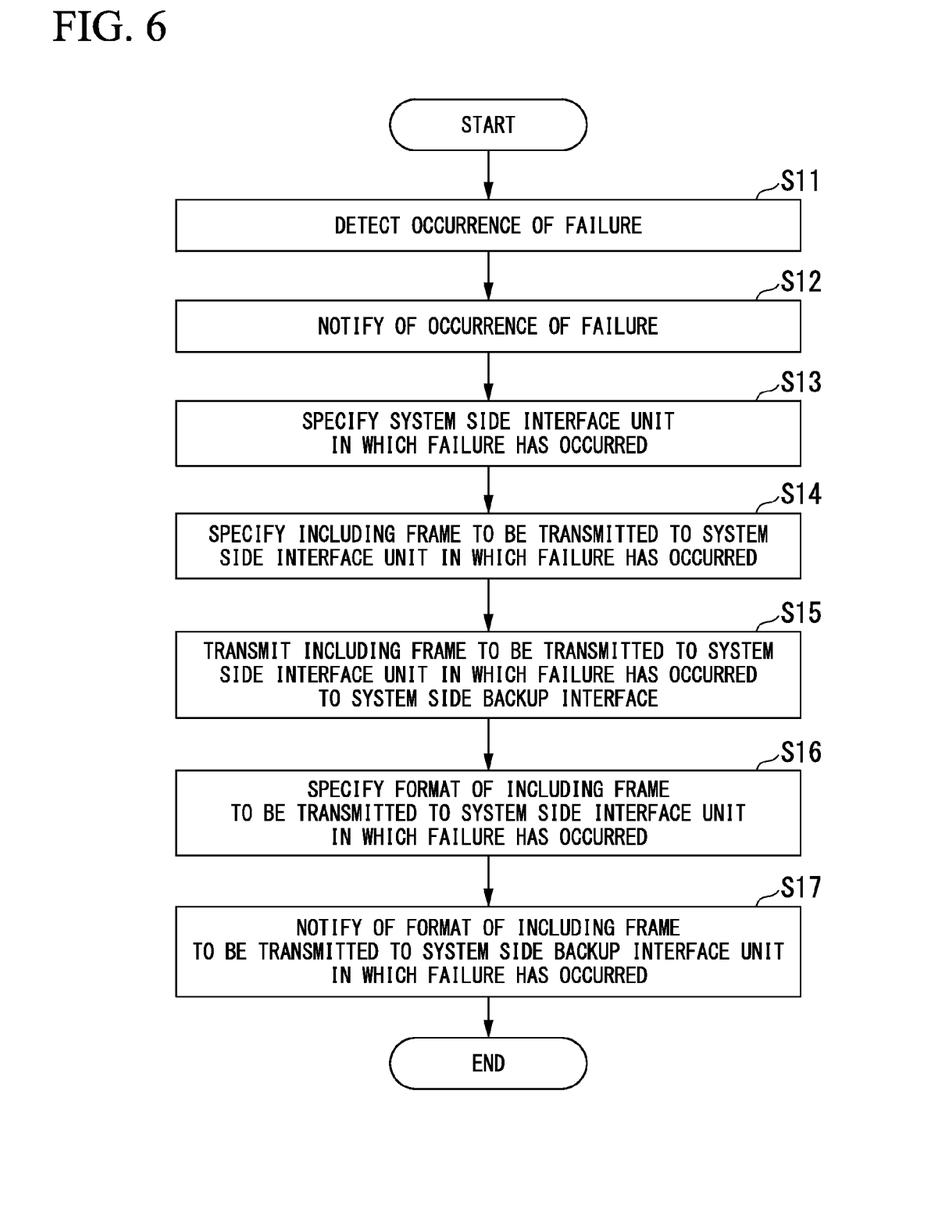
FIG. 6 is a flowchart illustrating an operation of a transmission system when failure occurs in a transmission path.

Next, an operation of the transmission system when failure occurs in a transmission path will be described.

FIG. 6 is a flowchart illustrating an operation of the transmission system when failure occurs in the transmission path.

When failure occurs in the transmission path, it is difficult to perform communication between the system side interfaces of the transmission device 10 in which communication is performed through the transmission path. For this reason, the transmission frame receiving unit 133 of the system side interface of the transmission device 10 detects the occurrence of failure by detecting the fact that it is difficult to perform communication with the opposite transmission device 10 (step S11), and notifies the failure detecting unit 151 of the switching control unit 15 of the occurrence of failure (step S12).

Next, the failure detecting unit 151 of the switching control unit 15 specifies the system side interface ID of the system side interface unit 13 that has detected the failure (step S13), and notifies the cross connect switching unit 153 and the multiplexing/demultiplexing switching unit 154 of the corresponding system side interface ID. Next, the cross connect switching unit 153 reads the client side interface ID and the time slot associated with the notified system side interface ID from the storage unit 152, and specifies an including frame to be transferred to the system side interface unit 13 in which the failure has occurred (step S14). Next, the cross connect switching unit 153 outputs a transfer command for transferring the specified including frame to the system side backup interface unit 14 to the cross connecting unit 12 (step S15).

Further, the multiplexing/demultiplexing switching unit 154 reads a format of the including frame associated with the notified system side interface ID from the storage unit 152 (step S16). Next, the multiplexing/demultiplexing switching unit 154 outputs a multiplexing/demultiplexing switching command for performing time division multiplexing/demultiplexing on the including frame of the read format to the multiplexing/demultiplexing map switching control unit 145 of the system side backup interface unit 14 (step S17). Further, the multiplexing/demultiplexing map switching control unit 145 outputs the multiplexing/demultiplexing switching command to the multiplexing scheme switching unit 1421 (FIG. 4) of the including frame multiplexing unit 1420 of the backup multiplexing unit 141 and the demultiplexing scheme switching unit 1433 of the including frame demultiplexing unit 1430 of the backup demultiplexing unit 144.

As a result, the including frame to be transferred to the system side interface unit 13 in which the failure has occurred can be transferred to the system side backup interface unit 14, and the system side backup interface unit 14 can multiplex the transferred including frame into the transmission frame by time division multiplexing.

Figure 7:
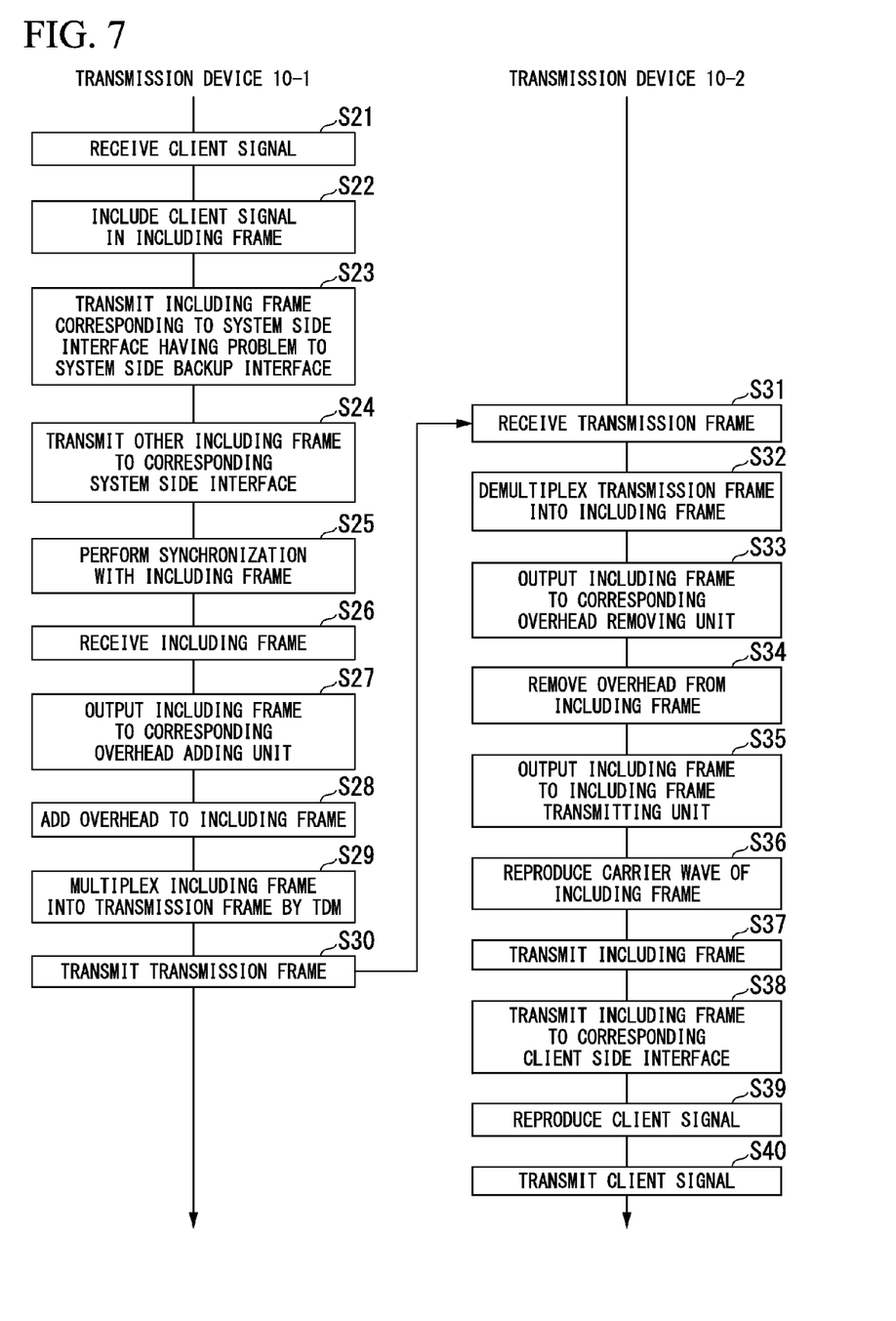
FIG. 7 is a sequence diagram illustrating an operation of a transmission system after failure occurs in a transmission path.

Next, an operation of the transmission system after failure occurs in the transmission path will be described.

FIG. 7 is a sequence diagram illustrating an operation of the transmission system after the failure occurs in the transmission path.

First, when the client device transmits the client signal to the transmission device 10-1, the client signal receiving unit 111 of the client side interface unit 11 of the transmission device 10-1 receives the client signal from the connected client device (step S21) and outputs the client signal to the including unit 112. Next, the including unit 112 includes the client signal input from the client signal receiving unit 111 in the payload portion of the including frame (step S22) and outputs the resultant including frame to the cross connecting unit 12.

Next, the cross connecting unit 12 outputs the including frame represented by the transfer command input from the cross connect switching unit 153 of the switching control unit 15 in step S15 among the including frames input from the client side interface unit 11 to the system side backup interface unit 14 (step S23). The cross connecting unit 12 outputs another including frame to the system side interface unit 13 represented by the system side interface ID associated with the client side interface ID of the client side interface unit 11 with reference to the table stored in the storage unit 152 of the switching control unit 15 (step S24).

Here, the process of the system side interface unit 13 receiving the including frame from the cross connecting unit 12 in step S24 is the same as the process subsequent to step S4.

Here, the process of the system side backup interface receiving the including frame from the cross connecting unit 12 in step S23 will be described with reference to FIGS. 4 and 7.

The including frame receiving unit 1410 of the backup multiplexing unit 141 of the system side backup interface unit 14 performs synchronization with the including frame output from the cross connecting unit 12 through the timing synchronizing unit 1411 (step S25), and receives the including frame from the cross connecting unit 12 (step S26). Next, the including frame receiving unit 1410 outputs the received including frame to the including frame multiplexing unit 1420.

Next, the multiplexing scheme switching unit 1421 reads the format of an including frame represented by the multiplexing/demultiplexing switching command input from the multiplexing/demultiplexing map switching control unit 145 and outputs the including frame input from the including frame receiving unit 1410 to the overhead adding unit 1422 corresponding to the corresponding format (step S27). For example, when the multiplexing/demultiplexing switching command indicates that eight ODU1 frames are multiplexed, the multiplexing scheme switching unit 1421 outputs each including frame input from the including frame receiving unit 1410 to the eight ODU13 adding units 1422-2.

Next, each overhead adding unit 1422 adds an overhead for multiplexing into the transmission frame to an input including frame (step S28), and outputs the resultant including frame the multiplexing processing unit 1423. Next, the multiplexing processing unit 1423 multiplexes the including frame input from each overhead adding unit 1422 into the transmission frame by time division multiplexing (step S29), and outputs the transmission frame to the backup transmission frame transmitting unit 142. The backup transmission frame transmitting unit 142 transmits the transmission frame input from the backup multiplexing unit 141 to the transmission device 10-2 (step S30).

Upon receiving the transmission frame from the transmission device 10-1 (step S31), the backup transmission frame receiving unit 143 of the transmission device 10-2 outputs the transmission frame to the backup demultiplexing unit 144. The demultiplexing processing unit 1431 of the including frame demultiplexing unit 1430 of the backup demultiplexing unit 144 demultiplexes the payload portion of the transmission frame input from the backup transmission frame receiving unit 143 into the including frame (step S32). Next, the demultiplexing processing unit 1431 reads a format of the including frame represented by the multiplexing/demultiplexing switching command input from the multiplexing/demultiplexing map switching control unit 145, and outputs each demultiplexed including frame to the overhead removing unit 1432 corresponding to the corresponding format (step S33).

Next, each overhead removing unit 1432 removes the overhead for multiplexing into the transmission frame from the input including frame (step S34), and outputs the resultant frame to the demultiplexing scheme switching unit 1433. Next, the demultiplexing scheme switching unit 1433 receives the including frame from the overhead removing unit 1432 corresponding to the including frame represented by the multiplexing/demultiplexing command input from the multiplexing/demultiplexing map switching control unit 145, and outputs the including frame to the including frame transmitting unit 1440 (step S35).

The timing synchronizing unit 1441 of the including frame transmitting unit 1440 reproduces the carrier wave of the including frame input from the demultiplexing scheme switching unit 1433 (step S36), and transmits the including frame to the cross connecting unit 12 (step S37).

Next, the cross connecting unit 12 outputs the including frame input from each system side interface unit 13 to the client side interface unit 11 represented by the client side interface ID associated with the system side interface ID of the system side interface unit 13 with reference to the table stored in the storage unit 152 of the switching control unit 15 (step S38).

Next, the developing unit 113 of the client side interface unit 11 develops the including frame input from the cross connecting unit 12, and reproduces the client signal (step S39).

Next, the client signal transmitting unit 114 transmits the client signal reproduced by the developing unit 113 to the client device (step S40).

Through the above-described process, the transmission system can transmit the client signal between the client devices even when the failure occurs in the transmission path.

As described above, according to the present embodiment, when any one of transmission paths to which a plurality of system side interface units 13 are connected has a problem, the cross connecting unit 12 outputs the including frame whose format matches the format of the including frame stored in the storage unit 152 in association with the system side interface ID having the problem among the including frames generated by the client side interface unit 11 to the system side backup interface unit 14. Thus, the transmission device 10 according to the present invention can reduce the number of backup communication lines provided in the transmission device 10 without including the system side interface unit 13 and the system side backup interface unit 14 in a one-to-one manner. Further, the client side interface unit 11 does not necessarily include multiplexing units corresponding to a plurality of multiplexing schemes, and thus the cost and the power consumption of the transmission device of the transmission device 10 can be reduced.

The embodiments of the present invention have been described above with reference to the drawings, but the concrete configuration is not limited to the above embodiments. Various design changes can be made in a range not departing from the gist of the present invention.

For example, the present embodiment has been described in connection with the example in which the system side interface unit 13 has a function of receiving only an including frame of a format and multiplexing the including frame into the transmission frame, but the present invention is not limited to this example. For example, when the system side interface unit 13 including the overhead adding unit 1422 adding an overhead corresponding to the including frame to including frames of two or more formats is provided, the system side interface unit 13 can receive the including frames of the two or more formats and multiplex the including frames into the transmission frame. In this case, the configuration of the system side interface unit 13 according to the above embodiment is complicated.

Further, the present embodiment has been described in connection with the example in which the system side backup interface unit 14 includes at least the ODU03 adding units 1422-1 which are as many as the largest number of ODU0 frames among the numbers of ODU0 frames input to the respective system side interface units 13, the ODU13 adding units 1422-2 which are as many as the largest number of ODU1 frames among the numbers of ODU1 frames input to the system side interface units 13, and the ODU23 adding units 1422-3 which are as many as the largest number of ODU2 frames among the numbers of ODU2 frames input to the system side interface units 13, but the present invention is not limited to this example For example, when each overhead adding unit 1422 has a buffer function such as queue, the including frame multiplexing unit 1420 may include the overhead adding units 1422 one by one. In this case, the multiplexing scheme switching unit 1421 outputs the including frame of the same format to one overhead adding unit 1422 corresponding to the corresponding format, and the overhead adding unit 1422 stores a plurality of input including frames in the queue. Further, the overhead adding unit 1422 takes each including frame out of the queue one by one, and adds an overhead to each including frame.

When each overhead removing unit 1432 has a buffer function such as a queue similarly to the above-described example, the including frame demultiplexing unit 1430 may include the overhead removing units 1432 one by one.

Further, the present embodiment has been described in connection with the example in which the transmission device 10 includes one system side backup interface unit 14, but the present invention is not limited to this example, and the transmission device 10 may include a plurality of system side backup interface units 14.

Further, the present embodiment has been described in connection with the example in which the system side backup interface unit 14 has the function of capable of multiplexing a plurality of different including frames, but the system side interface unit 13 does not have the function capable of multiplexing a plurality of different including frames. However, the present invention is not limited to this example, and the system side interface unit 13 and the system side backup interface unit 14 may have the function capable of multiplexing a plurality of different including frames. In this case, the system side interface unit 13 can function as the system side backup interface unit 14.

Further, the present embodiment has been described in connection with the example in which the ODU0 frame, the ODU1 frame, and the ODU2 frame are used as the including frame, and the ODU3 frame is used as the transmission frame. However, the present invention is not limited to this example and can be applied to any ODU band multiplexing configuration defined in ITU-T recommendation G.709.

The transmission device 10 includes a computer system therein. An operation of each processing unit is stored in a computer readable recording medium in the form of a program, and the process is performed such as the program being read and executed by the computer. Here, examples of the computer readable recording medium include a magnetic disk, a magnetic optical disc, a CD-ROM, a DVD-ROM, and a semiconductor memory. Further, the computer program may be delivered to a computer via a communication line, and the computer that has received the delivery may execute the program.

The program may implement a part of the above-described function.

In addition, the program may be a so-called differential file (differential program) in which the above-described function can be implemented in combination with a program previously recorded in a computer system.

Priority is claimed on Japanese Priority Patent Application, No. 2010-207541 filed in the Japan Patent Office on Sep. 16, 2010, the content of which is hereby incorporated by reference.

[Description of Reference Numerals]
- 10: transmission device
- 10-1: transmission device
- 10-2: transmission device
- 11: client side interface unit
- 12: cross connecting unit
- 13: system side interface unit
- 14: system side backup interface unit
- 15: switching control unit
- 111: client signal receiving unit
- 112: including unit
- 113: developing unit
- 114: client signal transmitting unit
- 131: multiplexing unit
- 132: transmission frame transmitting unit
- 133: demultiplexing unit
- 134: transmission frame receiving unit
- 141: backup multiplexing unit
- 142: backup transmission frame transmitting unit
- 143: backup demultiplexing unit
- 144: backup transmission frame receiving unit
- 145: multiplexing/demultiplexing map switching control unit
- 151: failure detecting unit
- 152: storage unit
- 153: cross connect switching unit
- 154: multiplexing/demultiplexing switching unit
- 1410: including frame receiving unit
- 1411: timing synchronizing unit
- 1420: including frame multiplexing unit
- 1421: multiplexing scheme switching unit
- 1422: overhead adding unit
- 1422-1: ODU03 adding unit
- 1422-2: ODU13 adding unit
- 1422-3: ODU23 adding unit
- 1423: multiplexing processing unit
- 1430: including frame demultiplexing unit
- 1431: demultiplexing processing unit
- 1432: overhead removing unit
- 1432-1: ODU30 removing unit
- 1432-2: ODU31 removing unit
- 1432-3: ODU32 removing unit
- 1433: demultiplexing scheme switching unit

The invention claimed is:

1. A transmission device that multiplexes a plurality of client signals into an Optical Data Unit (ODU) frame, and transmits the ODU frame to another device, comprising:
an including unit that includes an input client signal in a payload portion, and generates an including frame which is an ODU frame of a predetermined format;
a storage unit that stores identification information of a multiplexing unit that performs time division multiplexing on the client signal in association with a type of a client signal received by the including unit;
a cross connecting unit that outputs the including frame generated by the including unit to the multiplexing unit represented by the identification information stored in the storage unit in association with the format of the including frame;
a plurality of multiplexing units, each of which multiplexes the including frame input from the cross connecting unit into a transmission frame which is an ODU frame of a predetermined format by time division multiplexing;
a transmission frame transmitting unit that transmits the transmission frame multiplexed by the multiplexing unit to another device;
a backup multiplexing unit that multiplexes the including frame input from the cross connecting unit into a transmission frame of a predetermined format by time division multiplexing when one of the multiplexing units has a problem; and
a backup transmission frame transmitting unit that transmits the transmission frame multiplexed by the backup multiplexing unit to another device,
wherein the cross connecting unit outputs an including frame whose format matches a format of an including frame stored in the storage unit in association with identification information of the multiplexing unit having the problem among including frames generated by the including unit to the backup multiplexing unit when the multiplexing unit has the problem.

2. The transmission device according to claim 1, wherein the including unit generates an including frame of a format which is closest to a transmission rate of the client signal among including frames of two or more formats and has payload capacity being equal to or more than the transmission rate.

3. The transmission device according to claim 2, wherein the multiplexing unit includes an overhead adding unit that adds an overhead necessary for multiplexing the including frame having the payload capacity into the transmission frame by time division multiplexing to the including frame for each payload capacity of the including frame input from the cross connecting unit, and
the backup multiplexing unit includes a backup overhead adding unit that adds an overhead necessary for multiplexing the including frame having the payload capacity into the transmission frame by time division multiplexing to the including frame for each payload capacity of the including frame generated by the including unit.

4. A transmission method using a transmission device that includes a storage unit storing identification information of a multiplexing unit performing time division multiplexing on an including frame which is an ODU frame including a client signal for each type of the client signal, multiplexes the client signal, and transmits the multiplexed client signal to another device, the transmission method comprising:
generating, by an including unit, an including frame of a predetermined format in which an input client signal is included in a payload portion;
outputting, by a cross connecting unit, the including frame generated by the including unit to the multiplexing unit represented by identification information stored in the storage unit in association with the format of the including frame;
multiplexing, by each of a plurality of multiplexing units, the including frame input from the cross connecting unit into a transmission frame which is an ODU frame of a predetermined format by time division multiplexing;
transmitting, by a transmission frame transmitting unit, the transmission frame multiplexed by the multiplexing unit to another device;
when one of the multiplexing units has a problem, outputting, by the cross connecting unit, an including frame whose format matches a format of an including frame stored in the storage unit in association with identification information of the multiplexing unit having the problem among including frames generated by the including unit to a backup multiplexing unit;

multiplexing, by the backup multiplexing unit, the including frame input from the cross connecting unit into a payload portion of a predetermined transmission frame by time division multiplexing; and transmitting, by a backup transmission frame transmitting unit, the transmission frame multiplexed by the backup multiplexing unit to another device.

5. A non-transitory computer readable medium encoded with a computer program causing a transmission device, which multiplexes a plurality of client signals into an Optical Data Unit (ODU) frame and transmits the ODU frame to another device, to perform:

including an input client signal in a payload portion and generating an including frame which is an ODU frame of a predetermined format as an including unit;

multiplexing an including frame generated by the including unit into a transmission frame of a predetermined format by time division multiplexing as a multiplexing unit;

transmitting the transmission frame multiplexed by the multiplexing unit to another device as a transmission frame transmitting unit;

outputting the including frame generated by the including unit to the multiplexing unit represented by the identification information stored in a storage unit in association with the format of the including frame as a cross connecting unit;

multiplexing the including frame as a backup multiplexing unit in which the client signal is included by the including unit into a payload portion of a transmission frame of a predetermined format which is an ODU frame by time division multiplexing when one of the multiplexing units has a problem; and transmitting the transmission frame multiplexed by the backup multiplexing unit to another device as a transmission frame unit, wherein the cross connecting unit outputs an including frame whose format matches a format of an including frame stored in the storage unit in association with identification information of the multiplexing unit having the problem among including frames generated by the including unit to the backup multiplexing unit when the multiplexing unit has the problem.

* * * * *

UNITED STATES PATENT AND TRADEMARK OFFICE
CERTIFICATE OF CORRECTION

PATENT NO. : 9,014,550 B2
APPLICATION NO. : 13/823567
DATED : April 21, 2015
INVENTOR(S) : Masahiko Tsuchiya It is certified that error appears in the above-identified patent and that said Letters Patent is hereby corrected as shown below:

In the specification

Column 5, Line 43: Delete "ODU" and insert -- ODU0 --

Signed and Sealed this
Seventeenth Day of November, 2015

Michelle K. Lee
*Director of the United States Patent and Trademark Office*